(No Model.) 5 Sheets—Sheet 1.

T. T. ROCKETT.
FURNACE GRATE.

No. 441,023. Patented Nov. 18, 1890.

Witnesses
C. C. Burdine
H. E. Peck

Inventor
Thos. T. Rockett
per O. E. Duffy
Atty (No Model.) 5 Sheets—Sheet 2.

T. T. ROCKETT.
FURNACE GRATE.

No. 441,023. Patented Nov. 18, 1890.

Witnesses
C. C. Bundine
H. E. Peck

Inventor
Thos. T. Rockett
per O. E. Duff
Atty (No Model.) 5 Sheets—Sheet 3.
T. T. ROCKETT.
FURNACE GRATE.
No. 441,023. Patented Nov. 18, 1890.
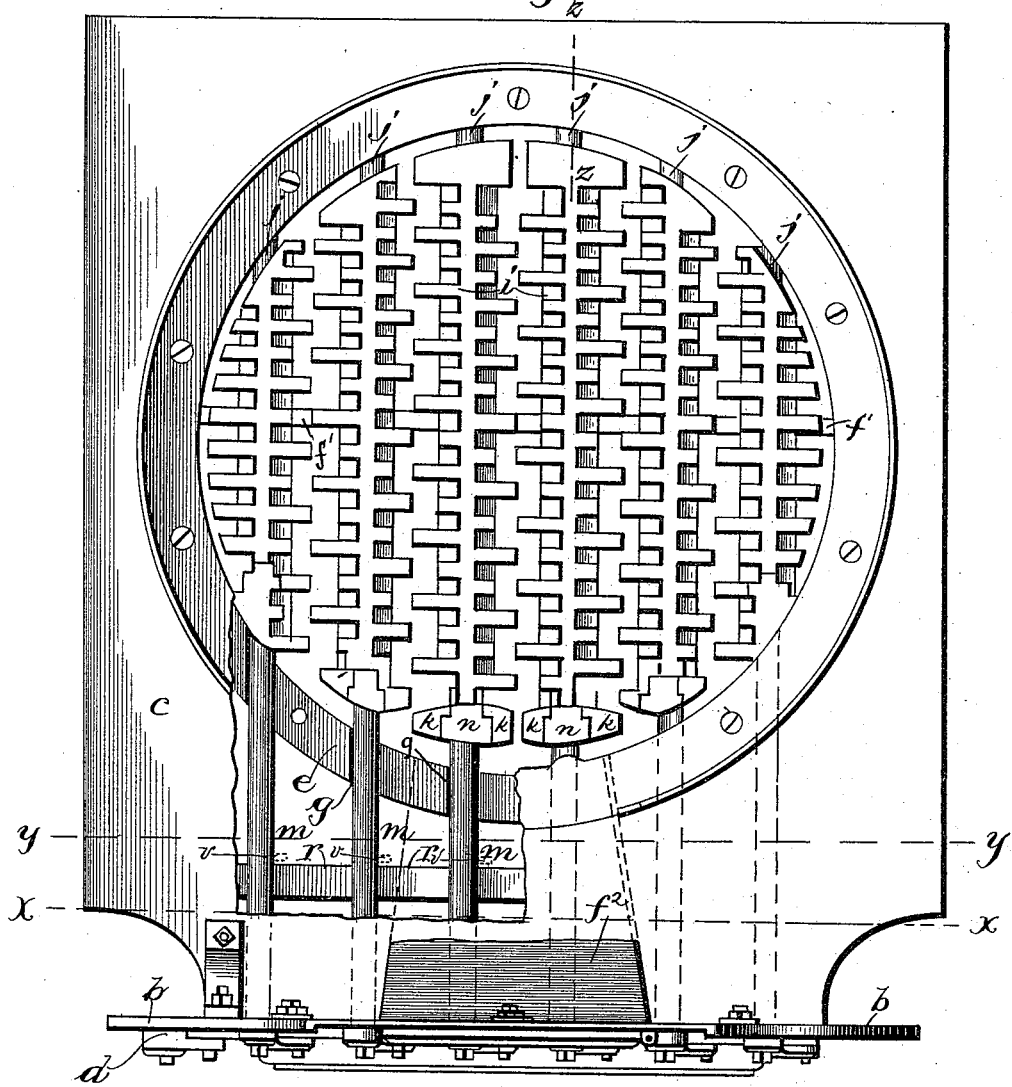
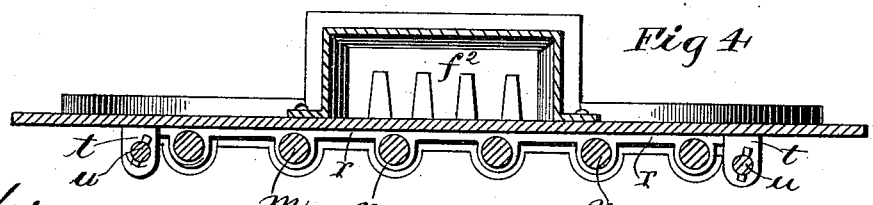
Witnesses.
Inventor
Thos. T. Rockett
per O. E. Duff
Atty (No Model.) 5 Sheets—Sheet 4.
T. T. ROCKETT.
FURNACE GRATE.
No. 441,023. Patented Nov. 18, 1890.
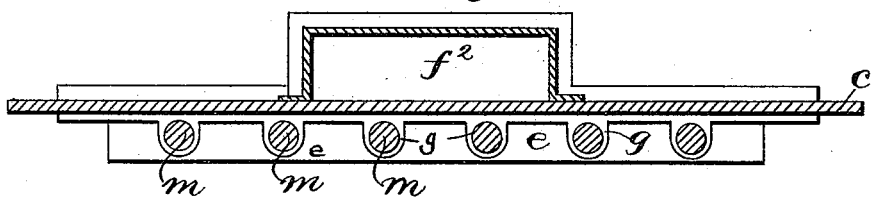
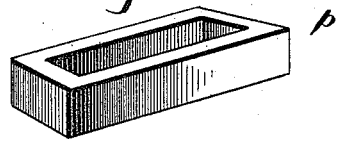
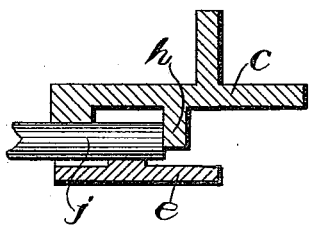
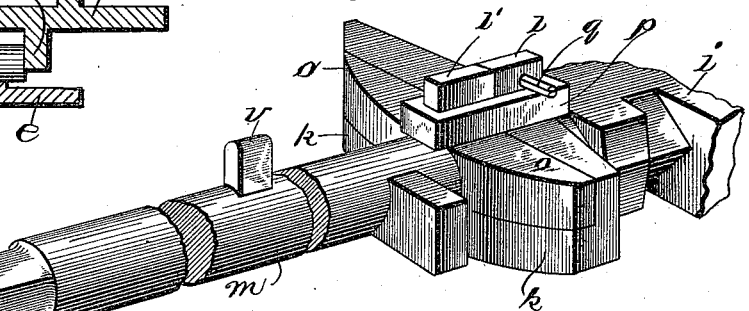
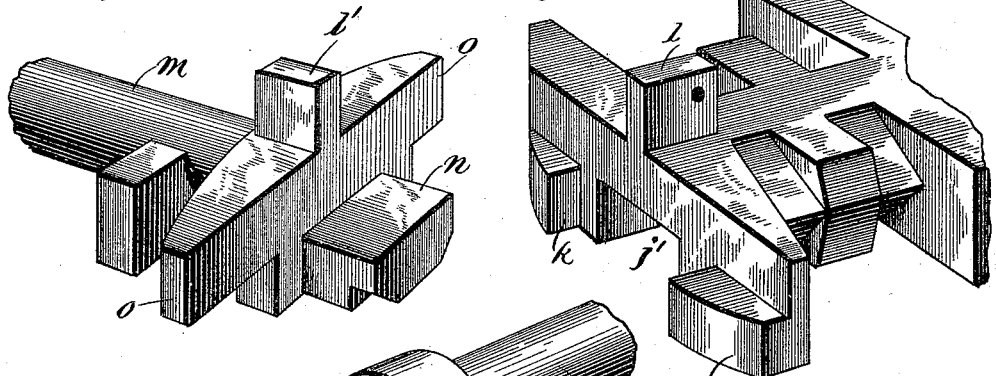
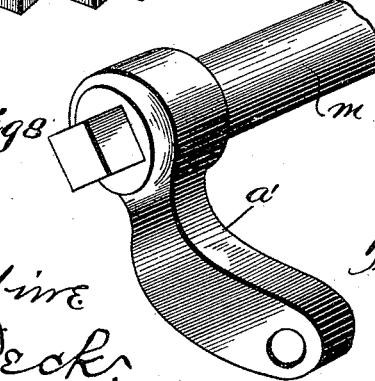
Witnesses
C. C. Burdine
H. E. Peck
Inventor
Thos. T. Rockett
per O. E. Duffy
Atty (No Model.)   5 Sheets—Sheet 5.

T. T. ROCKETT.
FURNACE GRATE.

No. 441,023.   Patented Nov. 18, 1890.

Witnesses
C. C. Burdine
H. E. Peck

Inventor
Thos. T. Rockett
per
C. E. Duffy
Atty

UNITED STATES PATENT OFFICE.

THOMAS T. ROCKETT, OF PHILADELPHIA, PENNSYLVANIA.

FURNACE-GRATE.

SPECIFICATION forming part of Letters Patent No. 441,023, dated November 18, 1890.

Application filed March 25, 1890. Serial No. 345,198. (No model.)

*To all whom it may concern:*

Be it known that I, THOMAS T. ROCKETT, of Philadelphia, in the county of Philadelphia and State of Pennsylvania, have invented certain new and useful Improvements in Furnace-Grates; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in furnace or fire grates.

The object of the invention is to provide an improved fire-grate, cheap in first cost, exceedingly simple and durable in construction, easy to operate, having interchangeable parts which can be separately replaced when broken, and composed of a minimum number of strong parts. These and other objects are accomplished by, and this invention consists in, certain novel features of construction and in combinations of parts, more fully described hereinafter, and particularly pointed out in the claims.

Figure 1:
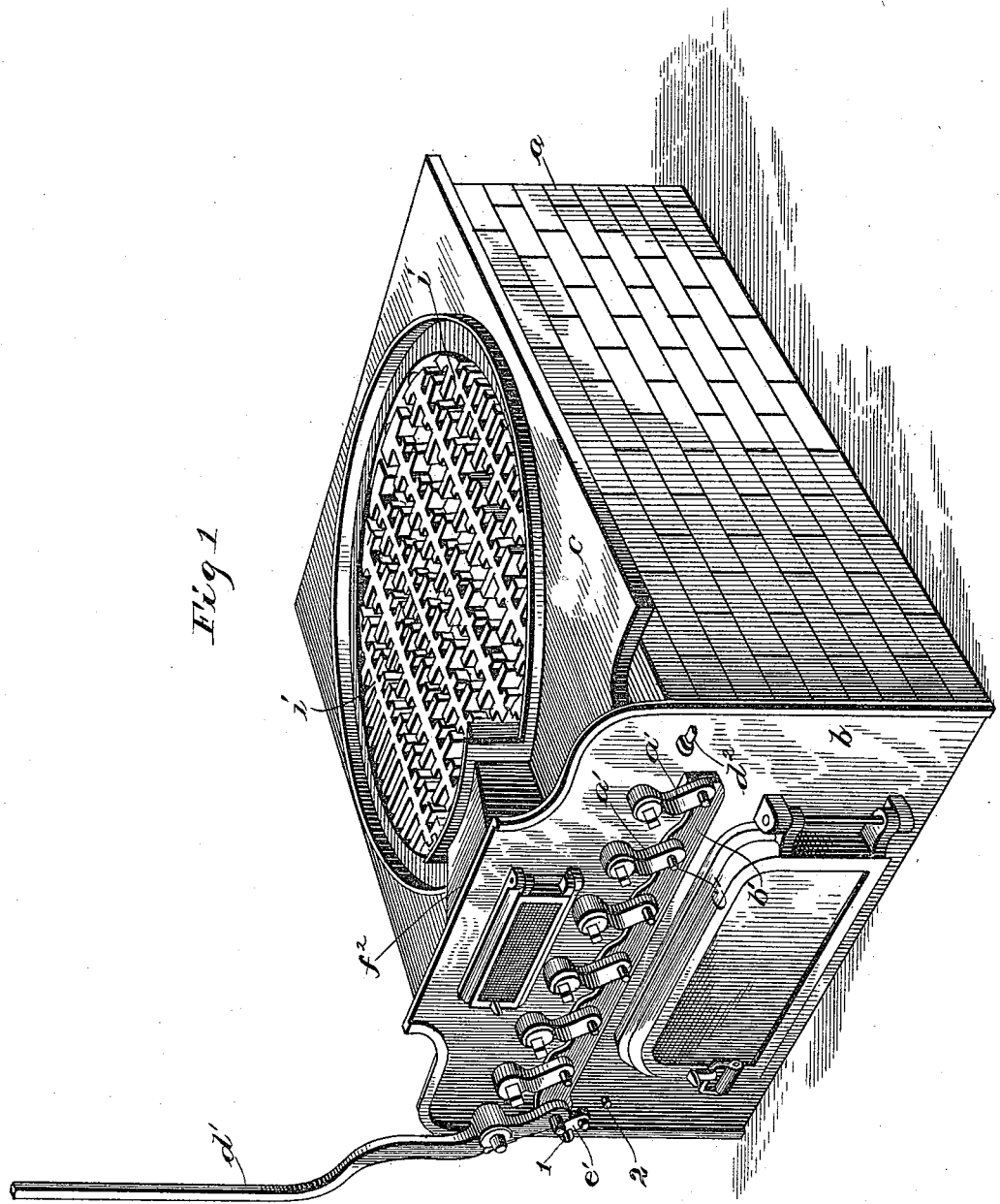
Figure 2:
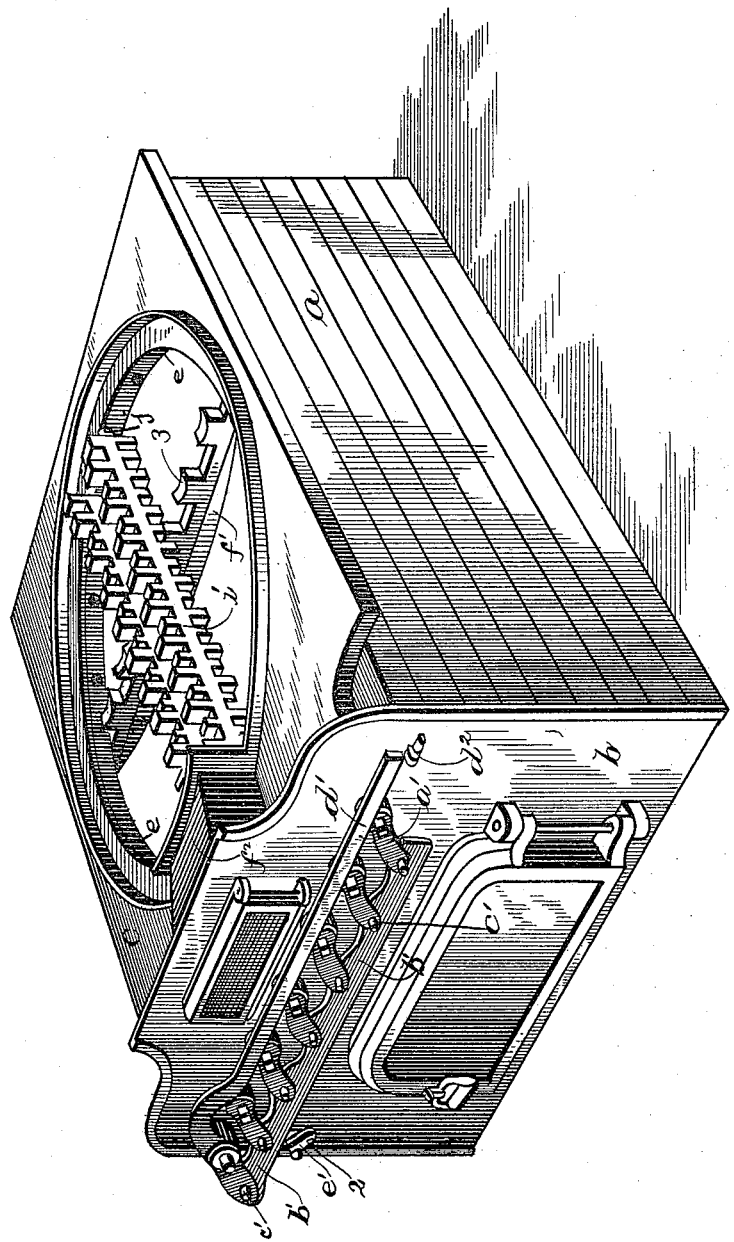
Figure 11:
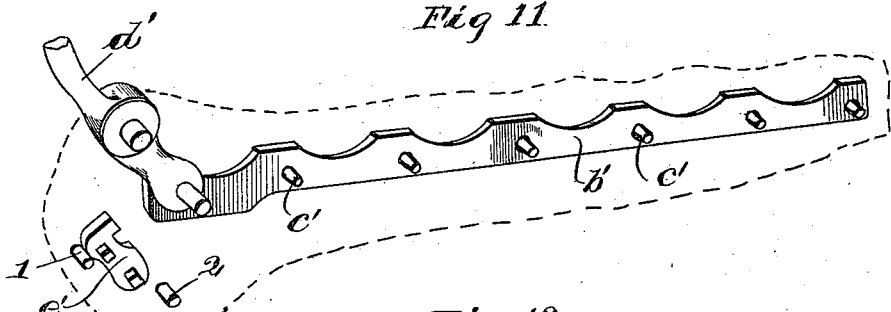
Figure 12:
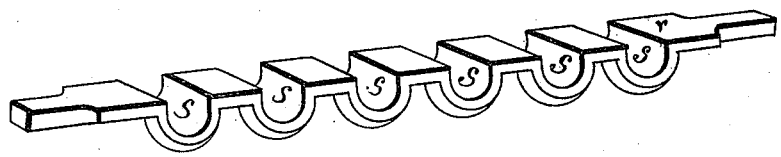
Figure 13:
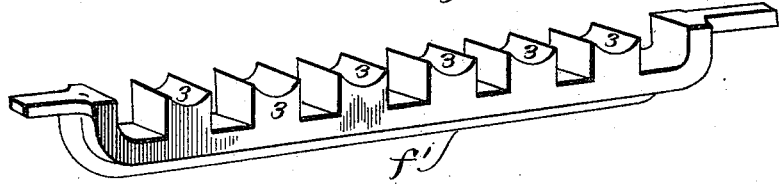

Referring to the accompanying drawings, Figure 1 is a perspective view of the lower portion of a furnace, showing the grate in its normal condition. Fig. 2 is a similar view showing the grate dumped, but two grate-bars being shown. Fig. 3 is a top plan, portions being broken away. Fig. 4 is a section on the line $x\ x$, Fig. 3, looking toward the grate-bars. Fig. 5 is a section on line $y\ y$, Fig. 3. Fig. 6 is a detail perspective of the under side of a portion of a grate-bar, showing the locked joint between the grate-bar proper and its journal. Fig. 7 is a detail perspective looking at the under side, and showing the two members of the joint separated. Fig. 8 is a detail perspective of the front end of a grate-bar journal, showing the lateral rocking or crank arm thereon. Fig. 9 is a detail section on the line $z\ z$, Fig. 3, showing how the inner or rear ends of the grate-bars are mounted. Fig. 10 is a detail perspective of the locking-loop securing the joint against longitudinal separation. Fig. 11 is a detail perspective of the reciprocating connecting-bar for rocking the grate-bars, showing the lower end of the rocking lever and the swinging stop whereby the movement of said connecting-bar is limited. Fig. 12 is a detail perspective of the bar on which the front ends of the grate-bar journals rest. Fig. 13 is a detail perspective of the supporting-bar for the centers of the grate-bars.

In the drawings, the reference-letter $a$ indicates the base of a furnace or the like, provided with a front $b$ and a supporting-plate $c$, closing the top of the ash-pit and adapted to support the upper part of the furnace and the fire-pot. This plate has the central opening between the fire-pot and ash-pit in which opening the grate is located. The separate horizontal rotary grate-bars extend across the said opening from front to rear, and are directly supported by the angle-ring $e$, located beneath the plate $c$, and rigidly secured thereto around said opening. This ring is preferably cast integral with U-shaped sockets, forming bearings or depressions $g$, closed at the top by the plate $c$, in which the journals of the bars separately rest and rotate, as shown in Figs. 3, 5, and 9, and at the rear of the grate the plate $c$ is provided with a downwardly-extending lug $h$, opposite each bearing in said supporting-ring $e$, and against which the rear ends of the rear grate-bar journals bear, to prevent longitudinal movement. (See Fig. 9.)

Each grate-bar is formed in two parts and consists of the front journal end and the grate portion proper $i$, to support the fire provided with the laterally-extending lugs, as usual, alternately long and short. This part $i$ is cast integral with the short cylindrical journal $j$ at the rear end and at the front end formed square and with a socket $j'$, open at the end and at the upper side of the bar, (see Fig. 7,) and with the two lugs $k\ k$, extending forwardly from opposite sides of the upper portion of the end, and with a perforated lug $l$, extending down from the under side of the bar at the end thereof. The other portion of the grate-bar consists of the cylindrical shaft or elongated journal $m$, squared on its outer end and at its inner end formed to correspond to the front end of the portion $i$, with a flat end to fit against the front end of bar $i$, with a forwardly-extending lug $n$ to fit in socket $j'$, with a pair of laterally-extending lugs $o\ o$ to rest beneath lugs $k$ $k$, and with a downwardly-extending lug $l'$ to correspond with the lug $l$. Thus when said parts are fitted together a strong double joint is formed. The lugs $k$ $k$, resting on lugs $o$ $o$, support the front end of bar $i$ from dropping, and the lug $n$ in socket $j'$ prevents bar $i$ from being thrown up and prevents lateral play, while the strong metal loop $p$, slipped over the two lugs $l$ $l'$ and held by pin $q$, prevents longitudinal separation of the joint and makes it more firm and rigid, and yet admits easy separation of the parts when it is removed. The inner end of the shaft $m$ is formed to correspond to the outer end of bar $i$, and is located within the central opening and supporting-ring, and said shafts extend from their bars $i$ through the front $b$ of the furnace, and at their inner ends rest in said bearings $g$ of the supporting-ring, and are again supported between said ring and the front $b$ by the horizontal supporting and bearing bar $r$, Figs. 3 and 12, provided with a series of U-shaped depressions $s$, forming bearings in each of which a shaft rests. This bar is secured to the under side of the plate $c$ by means of two pairs of depending ears $t$ $t$, cast on the under side of said plate, and between which the opposite ends of said bar are held by pins $u$ $u$, passed through the lugs. By this means the bar can be removed when desired without disturbing said shafts. Each shaft has a radially-extending lug $v$ cast thereon, so as to be located at the rear edge of said bar $r$ and prevent longitudinal movement of the shafts. The front ends of said shafts project beyond the front of the furnace in the same horizontal plane, and each shaft is provided with a downwardly-projecting crank or lateral arm $a'$, each arm $a'$ at its upper end having a squared socket removably fitting and secured on the squared end of its shaft and extending downwardly and outwardly, and at its lower end provided with an outwardly-tapered cylindrical socket or bearing. A horizontal reciprocating connecting-bar $b'$ is located between the front of the furnace and the lower ends of said crank-arms, and is provided with a series of projecting outwardly-tapered journals or pintles $c'$, formed integral with the bar and on its outer side, each pintle fitting loosely in a socket in the lower end of a crank-arm, so that when said bar is reciprocated all the crank-arms will simultaneously reciprocate their respective grate-bars. An exterior upright rocking lever $d'$ is journaled near its lower end upon and near one end of the stove-front, and the lower end of this operating-lever is bent somewhat toward the opposite side of the stove, and below its fulcrum is pivoted to the end of said connecting-bar by means of a pintle on the bar and socket in the end of the lever. Thus it will be seen that the grate-bars can be rocked by rocking this operating-lever, and when the lever is swung to the right into a substantially horizontal position the connecting-bar will be lifted and thrown to the left with the crank-arms so far that the grate-bars will be turned up edgewise, (see Fig. 2,) thereby leaving wide spaces between them and dumping the grate. The movement of the connecting-bar in the opposite direction is limited by the stop $d^2$, formed on the furnace-front, so that the grate can be dumped by rocking said lever in one direction only, said stop being so located that the connecting-bar can be moved far enough in that direction to rock or tilt the bars from the horizontal. The movement of the connecting-bar toward the left is usually and normally limited, so that the grate will not be dumped, but will merely tilt back and forth to rake the fire when the lever is rocked, by means of a swinging stop $e'$ at one end, pivoted to the front $b$ beneath the connecting-bar, so that when in its normal position, Figs. 1 and 11, its free end will be swung up and rest against a pin 1, and hence lie opposite the left-hand end of the connecting-bar and prevent movement of the bar toward the left far enough to dump the grate, but only allow it to move far enough to tilt the grate-bars. When it is desired to dump the grate, the free end of this stop is swung down out of the way of the connecting-bar and rests on pin 2. (See Fig. 2.)

When the grate-bars become highly heated and red hot, they are very apt to sag in the middle by reason of the weight of the fuel upon them. I overcome this difficulty by locating a horizontal supporting-bar $f'$ transversely beneath said bars. The supporting-bar has upwardly-extending lugs 3, (see Fig. 13,) concaved at their top ends, so that the grate-bars can rest therein and freely rotate without interference from said supporting-bar, and said lugs 3 are separated, so that the long arms of the bars can rest between them when the grate is dumped. This supporting-bar is suitably secured to the under side of the top plate at its ends. By reason of this construction of grate and operating mechanism therefor, and as said mechanism is beneath the top plate $c$, the fire-pot of the furnace can be provided with the poke-hole $f^2$, resting upon said top plate and opening through the front above the bar-shafts and their operating-cranks. This is a great improvement and advantage. By this construction great power and leverage is obtained to rock the grate-bars, and the fire can be quickly and easily raked or completely dumped, and large clinkers or lumps of coal can be quickly ground to powder when caught between the bars.

Any grate-bar can be removed and replaced without disturbing the operating mechanism or remainder of the bars by removing loop $p$ and dropping one end of the bar $r$ and then pushing the shaft of the grate-bar to be removed longitudinally forward, thus releasing the bar from its shaft, and its rear journal can be drawn out of its bearing and a new grate-bar can then be inserted and the parts restored to their normal positions. When the shaft is pushed forward, its crank-arm passes forward with it and slips off of its journal on the reciprocating connecting-bar, so that the apparatus will work just as well if a grate-bar is out.

Another great advantage is the ease and quickness with which the grate can be dumped and the fire dropped as the entire grate-surface is opened, and not merely a single narrow space opened through which the fire must be dumped, as is the case with many grates.

It is evident that many changes might be resorted to in the form and arrangement of the parts described without departing from the spirit and scope of my invention. Hence I do not wish to limit myself to the precise construction herein set forth.

What I claim is—

1. A grate-bar journaled at its rear end and at its front end formed with a central socket, and a pair of forwardly-extending lugs on opposite sides thereof, in combination with a horizontal shaft at its rear end provided with a central lug to fit said recess and a pair of opposite lugs to correspond and engage said lugs of the bar and means for holding the shaft and bar against longitudinal separation, substantially as described.

2. A grate-bar composed of the grate-bar proper and the front shaft, said parts being united by a longitudinally-separable joint, in combination with a pair of lugs extending from said parts at the joint and a loop holding said lugs against separation, substantially as described.

3. In a grate, in combination, the rocking grate-bars, the horizontal reciprocating bar connected with all of said grate-bars to tilt and dump the same, having its movement in one direction constantly limited to tilt the bars only, and an adjustable stop on the furnace-front arranged to move into or out of the path of said reciprocating bar so as to vary its movement in the opposite direction to tilt only or completely dump the grate-bars, and the operating-lever fulcrumed on the furnace-front and pivoted to said bar to reciprocate the same, substantially as described.

4. In combination, the rocking grate-bars having the cranks, the reciprocating bar at the furnace-front loosely connecting said cranks to tilt and dump said grate-bars, an operating-lever fulcrumed to the furnace-front and pivoted to said bar to reciprocate the same its full stroke, a stop formed on the furnace-front to limit the movement of said bar in one direction to only tilt the grate-bars, a swinging stop pivoted to the furnace-front, and a rest or stop on said front, so that said arm can be swung to lie on said rest in the path of said bar and thereby limit the reciprocation of the same, so that the grate-bars can be tilted only, arranged substantially as described.

5. In a furnace-grate, the combination of the rocking grate-bars, each bar being formed in two sections united by a longitudinally-separable joint, means to normally hold each bar against separation, the crank-arms at the exterior of the furnace-front rigid on the outer end of each bar and provided with horizontal open sockets in their outer ends, the horizontal reciprocating bar between the furnace-front and the outer ends of said cranks having the horizontal journals rigid with the bar and loosely fitting into said sockets, as and for the purpose set forth, and the lever to reciprocate said bar.

6. The combination of the longitudinally-separable grate-bars, the crank-arms rigid on their front ends at the exterior of the front having horizontal open sockets in their outer ends, the horizontal reciprocating bar behind said cranks having the outwardly-projecting horizontal journals integral therewith and loosely fitting therein, as and for the purposes set forth, and the rocking lever pivoted to said bar for reciprocating the same, all combined substantially as described.

7. In combination, the top plate, the annular supporting-ring secured on the under side of said plate and having depressions in its top surface open at each end, the grate-bars having their journals resting in said depressions, and the lugs formed integral with said top plate and extending into said depressions at the ends of the rear grate-bar journals to prevent rearward longitudinal movement thereof.

8. In combination, the shafts or journals, each jointed to the front end of a grate-bar by a longitudinally-separable joint, each shaft being provided with a lateral lug or projection, and the horizontal bar removably secured transversely to the under side of the furnace-top plate in front of said lugs and having depressions in its top side in which said shafts rest.

In testimony that I claim the foregoing as my own I affix my signature in presence of witnesses.

THOS. T. ROCKETT.

Witnesses:
- R. S. EAKIN,
T. R. LAWTON,
HENRY S. CALLAWAY.